United States Patent [19]

MacMillan

[11] Patent Number: 5,034,358

[45] Date of Patent: Jul. 23, 1991

[54] CERAMIC MATERIAL AND METHOD FOR PRODUCING THE SAME

[75] Inventor: Shaun T. MacMillan, Castle Rock, Colo.

[73] Assignee: Kaman Sciences Corporation, Colorado Springs, Colo.

[21] Appl. No.: 348,035

[22] Filed: May 5, 1989

[51] Int. Cl.[5] ........................ C04B 35/48; C04B 35/49

[52] U.S. Cl. .................................... 501/106; 501/103; 427/376.2; 427/397.7; 427/397.8

[58] Field of Search ............... 427/376.2, 397.8, 397.7; 501/102, 103, 106

[56] References Cited

U.S. PATENT DOCUMENTS

| | | | |
|---|---|---|---|
| 2,061,099 | 11/1936 | Morgan et al. . | |
| 3,248,249 | 4/1966 | Collins | 106/286 |
| 3,248,251 | 4/1966 | Allen | 106/286 |
| 3,285,757 | 11/1966 | Cornely | 106/57 |
| 3,632,359 | 1/1972 | Alper et al. | 106/57 |
| 3,734,767 | 5/1973 | Church et al. | 117/123 B |
| 3,754,978 | 8/1973 | Elmer et al. | 117/124 A |
| 3,789,096 | 1/1974 | Church et al. | 264/60 |
| 3,817,781 | 6/1974 | Church et al. | 117/169 |
| 3,873,344 | 3/1975 | Church et al. | 117/62 |
| 3,875,971 | 4/1975 | Hamling | 138/146 |
| 3,899,341 | 8/1975 | Schwarz | 106/57 |
| 3,925,575 | 12/1975 | Church et al. | 427/226 |
| 3,944,683 | 3/1976 | Church et al. | 427/34 |
| 3,956,531 | 5/1976 | Church et al. | 427/226 |
| 3,985,916 | 10/1976 | Church et al. | 427/46 |
| 4,007,020 | 2/1977 | Church et al. | 51/295 |
| 4,077,808 | 3/1978 | Church et al. | 106/40 R |
| 4,102,085 | 7/1978 | Church et al. | 51/295 |
| 4,382,104 | 5/1983 | Smith et al. | 427/226 |
| 4,544,607 | 10/1985 | Kaneno et al. | 428/472 |
| 4,585,499 | 4/1986 | Mase et al. | 156/89 |
| 4,615,913 | 10/1986 | Jones et al. | 427/226 |
| 4,621,064 | 11/1986 | Matsuura et al. | 501/15 |
| 4,624,831 | 11/1986 | Tommis | 419/20 |

*Primary Examiner*—Michael Lusignan
*Attorney, Agent, or Firm*—Rosen, Dainow & Jacobs

[57] ABSTRACT

A method of providing a ceramic coating on a substrate, for example of aluminum, where a slurry of a zirconium compound such as zirconia and a silicate such as potassium silicate is coated on a substrate and cured at a temperature not exceeding 500° F.

28 Claims, No Drawings

CERAMIC MATERIAL AND METHOD FOR PRODUCING THE SAME

BACKGROUND OF THE INVENTION

This invention relates to a method for producing a protective coating on materials such as aluminum, as well as to a coating produced by the method. The invention is in particular directed to a method and coating produced thereby, employing zirconia.

Aluminum is used extensively in industry. While the application of protective coatings to aluminum to enhance its usefulness is known, the application of ceramic coatings to low melting temperature materials such as aluminum has not been considered practical since such materials generally require thermal processes that would result in weakening the substrate, even though they may impart desirable surface properties that would extend the life and improve the efficiency of the aluminum component. Thus, in many instances coated aluminum could economically replace heavier metals, if properly protected. While many applications exist for such coatings, existing coatings either don't effectively protect the aluminum or other material, or require processing temperature that disadvantageously affect the aluminum.

The use of zirconia has been suggested in the past for various coatings, and as an additive. Thus, U.S. Pat. No. 3,875,971, Hamling, discloses the use of a zirconia coating, wherein an acidic zirconia coating is applied to a porcelain enamel coating on a metal. U.S. Pat. No. 4,624,831, Tommis, discloses the addition of zirconia fibers directly to molten aluminum to produce a composition with a melting point higher than aluminum. U.S. Pat. No. 3,632,359, Alper, discloses the addition of zirconia to a cast alumina-silicon refractory for the glass contact lining of a furnace, to decrease the tendency of the refractory to crack. U.S. Pat. No. 3,754,978, Elmer, discloses a glaze for glass from a slurry of water, powdered alumina and powdered zirconia, with an addition of ammonia to give a pH of 8.5. The slurry is dried on the glass with a flame at about 650° C., and finally reacted in a gas flame to produce a vitreous layer. U.S. Pat. No. 3,899,341, Schwarz discloses a refractory fired shaped element of zirconia oxide and zirconium silicate, the element being cast in gypsum molds and fired at about 1650° C. U.S. Pat. No. 4,585,499, Mase, discloses a ceramic material formed of a slurry of zirconia powder and a non-aqueous solvent, the product being fired at a temperature above 1,100° C. U.S. Pat. No. 4,621,064, Matsuura, discloses a low temperature sealing material, for example for sealing integrated circuit packages, of powdered glass, zinc oxide, silica and aluminum powder, and from 1 to 35% zirconia powder. U.S. Pat. No. 2,061,099, Morgan, discloses a refractory material encorporating zirconia, and adapted to be heat treated at temperatures from 600° to 1800° F. U.S. Pat. No. 4,544,607, Nagoya, discloses a ceramic composition encorporating zirconia, for use in an engine.

U.S. Pat. No. 3,285,757, Cornely discloses a cement composition useful for making bonds or castings, in which a compound is provided which includes a zirconium compound such as zirconia, and a binder precursor compound such as water soluble silicate. The sodium silicate is at least 8% by weight, and preferably at least 25%, of the combined weights of zirconium compounds that are used. In the aqueous solution as used, the silicate is about 26–32% by weight of the solution. A thin coating is applied to the pieces to be joined, they are joined together, and the cement is allowed to air dry. While the drying time may be overnight at room temperature, or at 160 to 170 degrees Fahrenheit for one hour, Cornely requires a high curing temperature, for example at 1100 degrees Fahrenheit for 20 minutes, to effect a final chemical action, at the high temperature, between highly viscous silicate and the zirconia and zircon.

The process of densification of a porous ceramic surface is known. In known techniques, however, curing temperatures of at least 600 degrees Fahrenheit have been required in order to convert chromium compounds in the densification solution to water insoluble chromium oxide. Thus, U.S. Pat. Nos. 3,734,767; 3,789,096; 3,817,781; 3,925,575: 3,944,683; 4,007,020; and 4,077,808, Church et al, disclose the densification of a ceramic by repeated steps of impregnating the ceramic with a metal capable of being converted to an oxide in situ, at temperatures of at least 600 degrees Fahrenheit. U.S. Pat. No. 3,873,344, Church et al discloses the densification of porous underfired ceramics, for use as bearing materials, wherein the ceramic is impregnated with a solution of a chromium compound and cured in one or more cure cycles of at least 600 degrees Fahrenheit, at least one cure cycle being at 1,300 degrees Fahrenheit. U.S. Pat. No. 3,956,531, Church et al discloses the densification of porous ceramic bodies by impregnating with a solution of chromium oxide and curing at temperatures in excess of 600 degrees Fahrenheit. U.S. Pat. No. 3,985,916, Church et al discloses the densification of metal parts plated with porous chrome with a chromic acid solution, the product being cured at a temperature of at least 600 degrees Fahrenheit. U.S. Pat. No. 4,102,085, Church et al discloses a process for producing an abrasive surface wherein a coating of an abrasive, a ductile metal powder and a binder of a soluble chromic compound is applied to an oxide coating on a metal substrate, and cured at a temperature of at least 600 degrees Fahrenheit. The process may be repeated. U.S. Pat. No. 4,615,913, Jones et al discloses a method for providing a thicker coating, employing chromium compound densification, and also requiring curing at a temperature of at least 600 degrees Fahrenheit to convert the chromium compound to a water insoluble chromium oxide.

SUMMARY OF THE INVENTION

The present invention is therefore directed to the provision of a method for coating substrates with a protective ceramic coating that does not have the disadvantages of the known processes, and that permits the coating process to be effected at low temperatures, i.e. temperatures not exceeding about 500° F. The invention is also directed to a coating produced by this process.

Briefly stated, in accordance with the invention, a substrate is coated with a slurry that is a mixture of a zirconium compound such as zirconia powder(s) and a silicate such as potassium silicate. In some embodiments of the invention the slurry may be a mixture of an organometallic zirconium compound and an organosilicate. It has thus been found that the zirconium compound and silicate react to produce a ceramic that can be cured at low temperatures. The resultant ceramic provides a wear, corrosion, and thermally resistant coating or a monolithic ceramic composite material.

The slurry may be applied to a substrate by any convenient conventional process, such as spraying or dipping.

Following the curing of the ceramic on the substrate, it may be densified, for example with an aqueous solution of chromic and phosphoric acids. Other materials may of course be alternatively employed for densification.

The invention thus provides a protective coating for many materials, including but not limited to aluminum, aluminum alloys, and glass and plastics, that can be cured at a temperature low enough to not effect the strength properties of the substrate.

While the coating of the invention is advantageously employed with substrates of many different materials, in view of its low temperature curing properties, the coating has been found to be especially advantageous when employed on aluminum and aluminum alloys. Aluminum (and other materials coated with the ceramic of the invention), may thus be used in much higher temperature applications, e.g. greater than 1000° F., involving wear resistance, adjustable electro-magnetic properties, and thermal barriers.

DETAILED DISCLOSURE OF THE INVENTION

In accordance with the invention, a slurry is made by mixing amounts of a zirconium compound with a silicate to produce a reaction therebetween. For example, milled zirconia with water and a solution comprised of potassium hydroxide and silica may be mixed to form the slurry. The particle size of the zirconia that is used is important to provide a coating that doesn't crack, case harden, or develop excessive porosity. Even though the preferred form the zirconia is a mixture of two or more different particle size distributions, single sized and distributions larger or smaller than the preferred form behave in a similar fashion. The preferred form consists of 90% by weight of zirconia with a Fisher number of 3.6 and the remainder with a Fisher number of 1.2. Zirconia as large as 35 mesh (about 700 microns) may be used, howevever, but decreased surface area of the zirconia results in decreases in the strength of the composite. Zirconia derived from colloidal solutions also behaves similarly, but in this case the ratio of potassium silicate should be increased due to the larger surface area of the smaller particles.

It is of course apparent that conventional additives may be added to the slurry.

The substrate is preferably prepared for the coating and any oil is removed. The surface preparation may include, for example roughening the area to be coated by grit blasting or by acid etching. If desired, the substrate may be fired to a temperature not exceeding 500° F. The slurry is then sprayed onto the surface of the substrate with a standard spraying device, e.g. a Binks spray gun or the equivalent. The slurry may thicken somewhat during the mixing and water or surface active agents may be added to improve the spraying characteristics. One or more layers may be needed to achieve the desired thickness. The preferred total thickness of the slurry on the substrate is about 3–10 thousandths of one inch. To achieve thicknesses greater than about one tenth of one inch the formulation may be altered by using larger particle size zirconia.

The freshly coated substrate may be fired to a maximum of about 500° F. over a period of several hours. Soaks at 100° F., 200° F., and 500° F. may be employed in this process. It should be stressed, however, that this firing is not essential since the slurry will cure at room temperature in 24 hours.

In a further embodiment of the invention, the slurry is employed without a substrate, in which case it may be molded or cast by conventional techniques. The other steps of the process of the invention are not changed in this modification thereof.

In accordance with the invention, the ceramic coating may be strengthened by densification, if desired. Densification involves soaking or painting the ceramic with a densification solution and subsequent firing. A densification solution is a liquid that when heated undergoes physical or chemical reactions that result in the liquid leaving the ceramic and depositing a solid in the pores. The quantity deposited, the degree of interaction and the chemical and physical nature of the solids deposited with respect to the existing ceramic determines the effect of the densification. Many liquids, solutions, colloidal dispersions, and mixtures may be used singly or mixed or used in sequence. The densification solution may be formed, for example, from a mixture of water, chromic acid ($CrO_3$) and 85% phosphoric acid. The component is sprayed, painted or dipped into the solution. The process may be aided with the use of vacuum and or pressure. After removing the excess solution the component is heated to effect the conversion of the solution to the end form. This depends on the specific solution used, the preferred chromic acid/phosphoric acid solution may be fired directly to 500° F. and allowed to equilibrate, however certain solutions such as colloidal and organometallics may require moderate or no heating.

The densification process is preferably repeated one or several times before machining the component (if machining is desired). The process is repeated one or more times after machining. Typically a total of 5 processing cycles is used.

The invention is not limited to the use of zirconium dioxide with the potassium silicate, and reactions of other inorganic zirconium compounds and silicates, as well as reactions of organometallic zirconium compounds with organosilicates to effect the same result may be substituted, in some cases enabling reactions at much lower temperatures.

The same mechanism holds for the colloidal densification process. This densification process is an alternation between colloidal zirconia and potassium silicate solutions with a firing step in-between. The invention is of course not limited to the use of colloidal zirconia, this merely constituting a convenient form of zirconia. For example, zirconia derived from the thermal decomposition of tetra-n-propyl zirconate ($Zr(OC_3H_7)_4$) or other organo-zirconium compounds has also been found to be satisfactory.

Aluminum and its alloys are not the only substrates that can bond to the system of the invention. Glass, stainless steel, and some plastics have been bonded to the system. Thus, if a substrate surface contains or can be modified to contain covalently attached aluminum, alumina, silica, zirconate or hydroxyl functional groups, bonding may occur.

The process in accordance with the invention may be effected at low temperatures, i.e. not above about 500° F., that do not deform or weaken the substrate. Thus, the invention overcomes the disadvantages of prior ceramic coatings that require processing temperatures up to several thousand degrees F. Additionally it has been found that the coating of the invention forms a strong bond to aluminum, its alloys, and other materials. This allows a heat resistant ceramic to be bonded to a metal without heating the metal beyond its softening point. Because of the low temperature and mild chemical environment of the process, many different materials may be included with the coating, such as inorganic and organic fibers, metal powders, cloths, and reticulated foams of metals, ceramics, and polymers.

The chemicals used may be technically pure. The strength of the composite is sensitive to the particle size distribution of $ZrO_2$. In general the smaller the particle size the stronger the composite because of the greater surface area. The distribution of the sizes is also important because of the packing density. A narrow distribution will not pack as closely as a large distribution or a mixture of relatively large and small particles. The range is therefore from monolithic $ZrO_2$ to submicron sizes. The range for the ratio of potassium silicate to zirconia depends on the surface area of zirconia since only a fixed amount of potassium silicate will react. The range of potassium silicate to zirconia is hence a fixed proportion of the surface area of zirconia.

Mixing is required to disperse the zirconia in the potassium silicate so that intimate contact between each particle of zirconia and potassium silicate is obtained. The mixing may be effected, for example in a ball mill using ceramic balls.

The slurry may be applied to the substrate by spraying, dipping, and casting. Other methods may alternatively be employed. As above discussed, firing the slurry may be used to reduce the processing time, but is not absolutely necessary. The length an ambient cure is from 4–24 hours depending on the humidity. Firing decreases the time required to cure. Heating the slurry too quickly can cause the water to explosively evaporate. Soaks at 100° F., 200° F., and 500° F. have been found to be beneficial.

Densification or strengthening of the composite may or may not be necessary depending on the end use and the slurry formulation used. A distribution of zirconia that contains particles smaller than about 1 micron with much smaller particles has been found to pack sufficiently close that densification is not possible. When densification is used, any liquid that will deposit a solid in the pores and is chemically compatible may be used.

In the densification process it is also possible to employ the same mechanism that was used in the initial slurry, that is, employing a reaction of alkaline dissolved silica with zirconia. By depositing solid zirconia in the pores (by any of several means such as from colloidal zirconia, or from organo zirconates) and then impregnating with potassium silicate (or any source of silica and a strong base), firing and then repeating the process a number of times the pores will be filled with the same material that gives the composite strength. Alternatively, a method may be employed wherein chromia is deposited in the pores by thermal conversion of chromium VI oxide (chromic acid) as an aqueous solution with phosphoric acid and subsequently fired to 500° F. This is the preferred process because of the greater strength and chemical resistance of chromia. Obviously combinations of the either or both of the two methods above with colloidal sols and organometallic compounds may have beneficial properties.

EXAMPLES OF THE INVENTION

In accordance with one embodiment of the invention, a slurry was made by mixing amounts of milled zirconia with water and a solution comprised of potassium hydroxide and silica (known as potassium silicate, although non-stoichiometric) in the ratio of 8:1:1 by mass. The zirconia consisted of 90% by weight of zirconia with a Fisher number of 3.6 and the remainder with a Fisher number of 1.2. These zirconia powders have an average particle size of 8 and 1.5 microns respectively.

The substrate was roughened by grit blasting or by acid etching the area to be coated. The slurry was mixed for 4–10. hours at 55 rpm with a 160 gram charge of milling balls to 120 grams of slurry. The slurry was then sprayed onto the surface of the substrate with a standard spraying device, i.e. a Binks spray gun. The total thickness of the slurry on the substrate was about 3–10 thousandths of one inch. The freshly coated substrate was fired to a maximum of about 500° F. over a period of several hours.

In order to densify the coating, a mixture of water, chromic acid ($CrO_3$) and 85% phosphoric acid in the approximate ratio of 1:1.6:4.4 by weight was used. The component was sprayed with this solution. After removing the excess solution the component was heated to 500° F. to effect the conversion of the solution to the end form. The densification process was repeated several times.

The thickness of the applied ceramic layer is stable within a range of about 2 to 6 mils (0.002–0.006 inches). Thinner coatings do not sufficiently cover the substrate metal. This appears to be a processing phenomena because thicker layers can be machined or lapped to less than 2 mils with ease. Applied layers thicker than about 6 mils crack during drying, apparently due to shrinkage from water loss and average particulate diameter. Table I lists experimental results for different thickness of the applied ceramic layer.

TABLE I

THICKNESS VERSUS BONDING

| Thickness of Coating Mils | Results |
|---|---|
| 1.9 | Spall |
| 1.5 | Spall |
| 1.7 | Spall |
| 2.4 | No disbond |
| 3.6 | No disbond |
| 5.7 | No disbond |
| 4.5 | No disbond |
| 7.3 | Cracked |
| 8.1 | Cracked |
| 6.7 | Cracked |

Table 2 illustrates the effect of maximum temperature and rate of heating on the curing step. The curing can be accomplished at room temperature exposure for at least 24 hours. Higher temperatures will achieve the same results in less time however. Slurry cured at temperatures greater than 1000° F. do not appear different from those cured at 500° F. or room temperature.

TABLE 2

CURING TEMPERATURE VERSUS BONDING

| Curing Temperature | Time To Achieve Cure | Results |
|---|---|---|
| Ambient (60 +/− 10° F.) | 24 hours | Bonded |
| Ambient (60 +/− 10° F.) | 18 hours | Not Cured |
| Ambient (60 +/− 10° F.) | 4 hours | Not Cured |
| 200° F. | 2 hours | Bonded |
| 200° F. | 1 hour | Not Cured |
| 200° F. | 0.5 hour | Not Cured |
| 500° F. | 3 minutes | Bonded |

TABLE 2-continued

| CURING TEMPERATURE VERSUS BONDING | | |
|---|---|---|
| Curing Temperature | Time To Achieve Cure | Results |
| 1000° F. | 1 minute | Cured* |

* Although this coupon cured there were indications of explosive boiling. This coupon was 1018 steel to avoid aluminum melting.

Greater or lesser amounts of binder changes the nature and usefulness of the coating. Coupons were prepared with various ratios of zirconia (in the preferred mixture of particle sizes) to binder. As table 3 shows the 8:1 ratio is the preferred formulation. This formulation is most likely due to the available surface area of the zirconia. There is a minimum amount of binder needed to react with the surface of the zirconia below which interparticle bonding is not expected (see 10:1 ratio table 3). Greater amounts of binder than the preferred amount rise to the surface and do not interact with the matrix (see 6:1 ratio in table 3).

Because this bonding takes place between particles of zirconia with the aid of the binder, the controlling factor is the surface area of the zirconia, not the weight. This is similar to absorption properties of activated charcoal. Various methods exist for making micron sized zirconia. The surface area from these methods may be different for similarly sized particles. Convenience dictates use of mass measurements for preparation of slurries, not surface area measurements. The preferred form is identified by mass and not surface area for this reason.

TABLE 3

| ZIRCONIA RATIO VERSUS BONDING | |
|---|---|
| Ratio Zirconia to Balance | Integrity of Matrix Result of Sliding Steel on Surface |
| 10:1 | Crumbled at Touch |
| 9:1 | Crumbled with Force |
| 8:1 | Removed Steel from Blade |
| 7:1 | Removed Steel from Blade Pockets of Soft Silaceous Material |
| 6:1 | Layer of soft silaceous material |

Wear resistance was approximate by running a diamond wheel against the surface of the coating. This method is advantageous because of the short testing time. Known wear materials require 70–90 seconds for this test (such as K-ramic, plasma sprayed alumina, and tungsten carbide). Table 4 shows how the densification of the preferred formulation with a chromicphosphoric acid mixture improves the wear resistance. These items were the preferred 80:20 zirconia in an 8:1 zirconia to binder ratio cured at 500° F. for 3 minutes densified the cycles indicated in table 4 with 40:25 concentrated phosphoric acid to 1.65 g/cm$^3$ aqueous chromic acid. Further cycles were attempted, however there was no apparent retention of the impregnant after the sixth cycle.

TABLE 4

| DENSIFICATION CYCLES VERSUS WEAR CHROMIC-PHOSPORIC ACID DENSIFICATION NORMALIZED TO 0.0025 INCH COATING THICKNESS | |
|---|---|
| Number of Densification Cycles | Wear Time (Seconds) |
| 0 | 10 |
| 0 | 12 |
| 0 | 9 |

TABLE 4-continued

| DENSIFICATION CYCLES VERSUS WEAR CHROMIC-PHOSPORIC ACID DENSIFICATION NORMALIZED TO 0.0025 INCH COATING THICKNESS | |
|---|---|
| Number of Densification Cycles | Wear Time (Seconds) |
| 1 | 47 |
| 1 | 52 |
| 1 | 51 |
| 2 | 59 |
| 2 | 62 |
| 2 | 58 |
| 3 | 71 |
| 3 | 71 |
| 3 | 75 |
| 4 | 75 |
| 4 | 79 |
| 4 | 83 |
| 5 | 80 |
| 5 | 86 |
| 5 | 81 |
| 6 | 79 |
| 6 | 82 |
| 6 | 83 |

Various impregnants may be used to densify the ceramic matrix. The key is that a solid is deposited into the pores by the liquid impregnant, usually the result of heating. The properties of the coating system may be altered by the choice of impregnants: the chromic-phosphoric acid mixure is a good wear and corrosion resistance choice but not good for electrical insulation, whereas colloidal zirconium nitrate (which converts to zirconium oxide) has good electrical insulative properties. Combining the two systems yields a coating with good electrical resistance and good wear resistance. In particular a coupon coated with the preferred slurry, densified 10 cycles with colloidal zirconium nitrate and then 4 cycles of chromic-phosphoric acid mixture exhibited a resistance of greater than 20 meg-ohms at 500 volts with thirty days resistance to concentrated hydrochloric acid. Many variations are possible, those listed in table 5 indicate only a few choices.

TABLE 5

| DENSIFICATION TYPE AND CYCLES VERSUS WEAR | | | |
|---|---|---|---|
| Impregnant Type | Curing Temperature | Time Fired | Cycles Required to Seal |
| Colloidal Zirconinum Nitrate | 500° F. | 2 hrs | 20 |
| Colloidal Silica | 500° F. | 2 hrs | 12 |
| Colloidal Zirconium Silicate | 300° F. | 1 hr | 15 |
| n-Propyl Zirconium Oxide | 600° F. | 4 hrs | 17 |
| tetra-Ethyl Orthosilicate | 500° F. | 1 hr | 15 |

The "Cycles Required to Seal" is the number of times the indicated impregnant was used until there was no observed absorption of the impregnant into the ceramic matrix.

While the invention has been disclosed and described with reference to a limited number of embodiments, it will be apparent that variations may be made therein, and it is therefore intended in the following claims to cover each such variation and modification as falls within the true spirit of the invention.

What is claimed is:

1. A method for producing a ceramic component comprising zirconia and silica comprising:

A. preparing a slurry comprising:

a) a zirconium compound and b) a source of silica selected from the group consisting of:

1. a solution of a soluble silica and potassium hydroxide, or
2. a solution of an organosilicate with water; said zirconium compound and said source of silica in said blend being present in sufficient amounts to allow said blend to be cured, B. curing said slurry at a temperature not exceeding about 500° F. to obtain a product having structural integrity.

2. The method of claim 1 comprising densifying said ceramic component following said step of curing.

3. A method for producing a ceramic coating on a substrate comprising coating the slurry defined in claim 1 on a substrate and curing said slurry on said substrate at a temperature not exceeding 500° F. to provide a ceramic coating having structural integrity.

4. The method of claim 3 wherein said zirconium compound is selected from the group consisting of zirconium dioxide or organometallic zirconium compound.

5. The method of claim 3 wherein said coating step comprises spraying said substrate with said slurry.

6. The method of claim 3 wherein said coating step comprises dipping said substrate in said slurry.

7. The method of claim 3 wherein said coating step comprises coating an aluminum substrate with said slurry.

8. The method of claim 3 wherein said coating step comprises coating said substrate with said slurry to a thickness from about 0.002 to about 0.006 inches.

9. The method of claim 8 wherein following said curing step the thickness of said coating is reduced to be less than about 0.002 inches.

10. The method of claim 3 wherein said coating step comprises coating said substrate having an aluminum compound surface with said slurry.

11. The method of claim 3 wherein said zirconium compound in said slurry comprises zirconia having at least two different particle sizes.

12. The method of claim 3 wherein said curing step consists of curing said slurry at room temperature for 24 hours.

13. The method of claim 3 wherein said curing step consists of curing said slurry at about 500° F. for 3 minutes.

14. The method of claim 3 wherein said curing step consists of curing said slurry at 200° F. for 2 hours.

15. The method of claim 3 wherein said ceramic coating is densified after said curing step.

16. The method of claim 15 wherein said densifying step comprises densifying said coating with a solution of water, chromic acid and phosphoric acid.

17. The method of claim 15 wherein said densifying step comprises densifying said coating with coloidal zirconia and potassium silicate solutions.

18. The method of claim 15 wherein said densifying step comprises applying a densifying material to said coating, to fill pores contained in said coating and then firing said coating at temperature of 500° F. or less.

19. The method of claim 3 wherein said zirconium compound is an organometallic zirconium compound and said silicate is an organosilicate.

20. The method of claim 3 wherein said step of preparing comprises preparing a slurry of zirconia and a binder that includes a silicate, with a ratio by volume of the zirconia and the silicate being from 7:1 to 9:1.

21. A ceramic component produced by preparing a slurry of a zirconium compound and a soluble silicate and a source of silica selected from the group consisting of a) a solution of soluble silica and potassium hydroxide or b) a solution of an organosilicate with water, said zirconium compound and said source of silica in said blend being present in sufficient amounts to allow said blend to be cured, and curing said slurry at a temperature not exceeding 500° F. to provide a ceramic component having structural integrity.

22. A combination of ceramic coating, comprising the ceramic component as defined in claim 21, and a substrate wherein said coating comprises a slurry of a zirconium compound and soluble silicate which is coated onto said substrate and cured at a temperature not exceeding 500° F.

23. The combination of claim 22 wherein said zirconium compound is comprises zirconia.

24. The combination of claim 22 wherein said silicate is comprises soluble silica.

25. The combination of claim 22 wherein said slurry coated onto said substrate is cured at room temperature.

26. The combination of claim 22 wherein said substrate is aluminum.

27. The combination of claim 22 wherein said coating has a thickness from 0.002 to 0.006 inches.

28. The combination of claim 22 wherein said coating has a ratio, by volume, of zirconia to silicate from 7:1 to 9:1.

* * * * *